July 26, 1949. C. E. PAGE 2,477,416
POPCORN MACHINE
Filed June 2, 1945 4 Sheets-Sheet 2
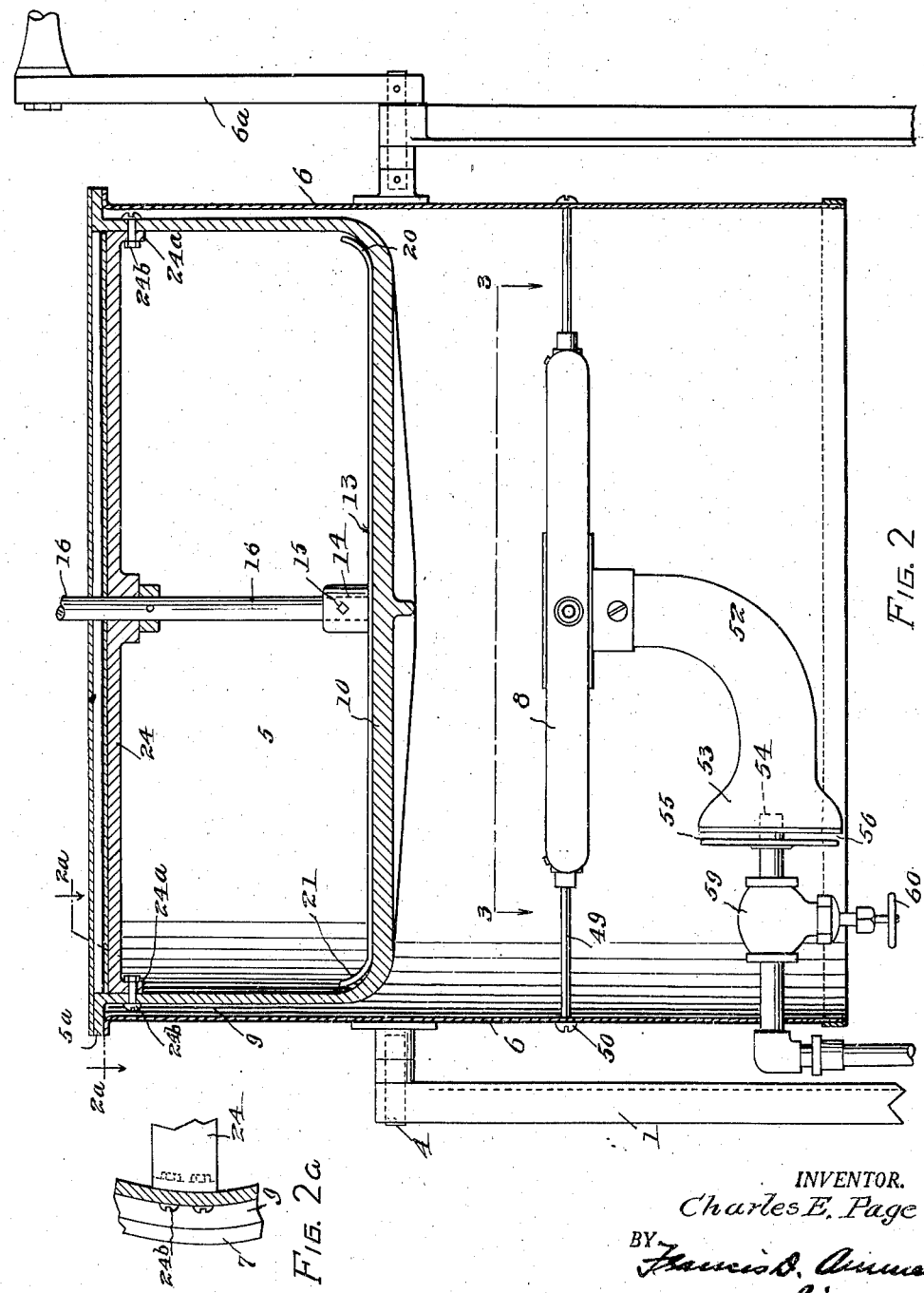
INVENTOR.
Charles E. Page
BY
Francis D. Ammen
his Atty.

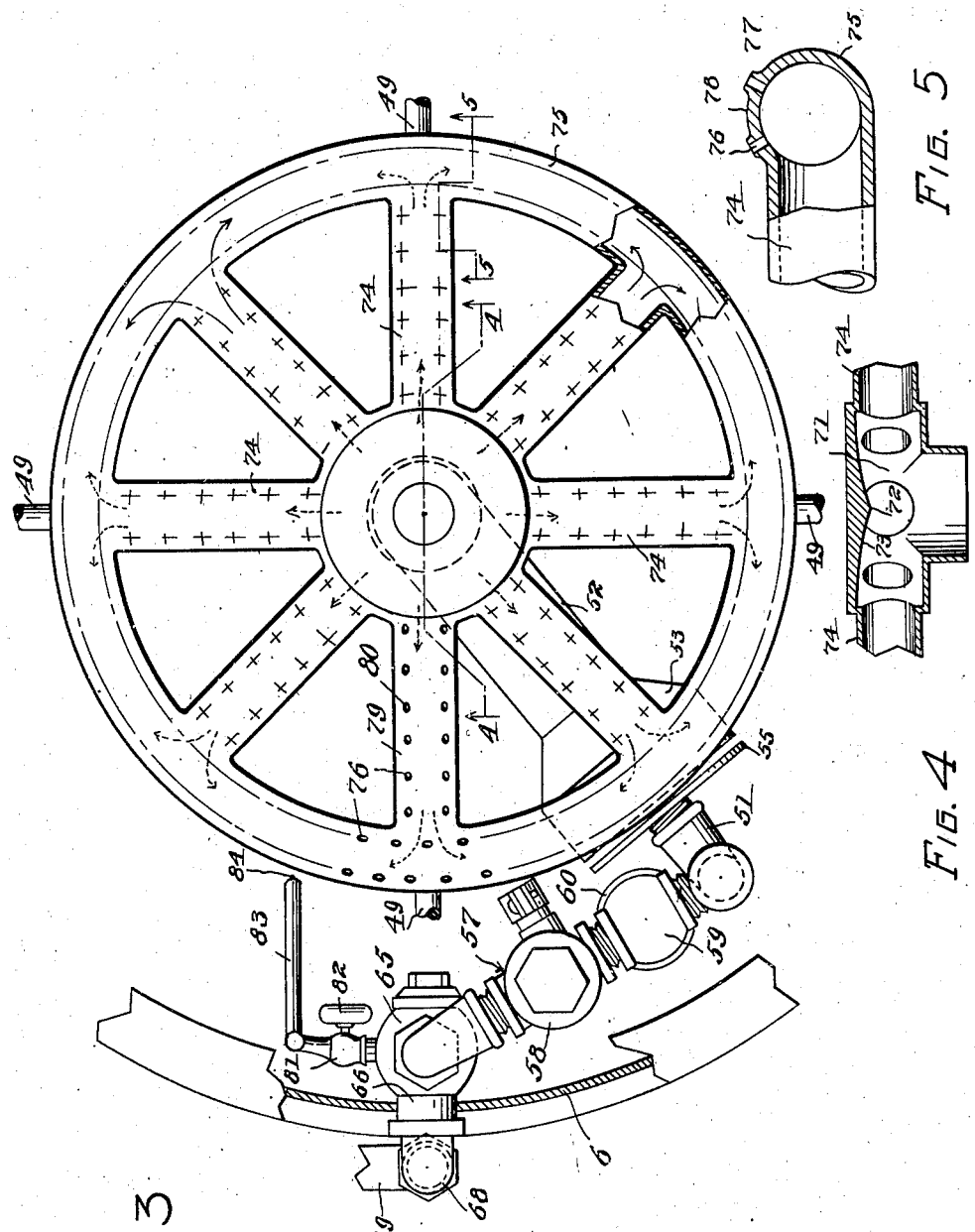

July 26, 1949.  C. E. PAGE  2,477,416
POPCORN MACHINE
Filed June 2, 1945  4 Sheets-Sheet 4
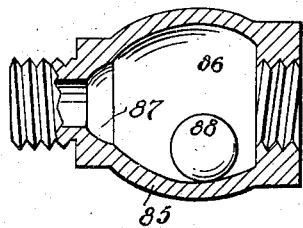
F/G. 8
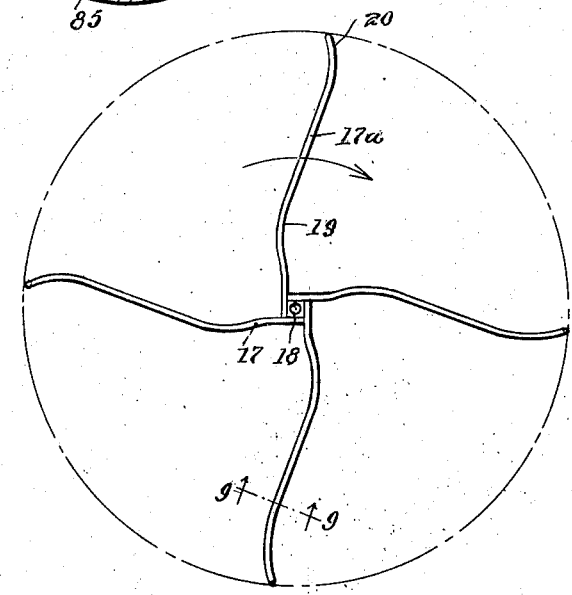
F/G. 6
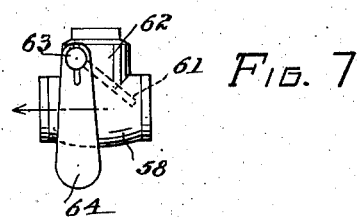
F/G. 7
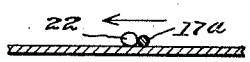
F/G. 9
INVENTOR.
Charles E. Page
BY
его Atty.

Patented July 26, 1949

2,477,416

UNITED STATES PATENT OFFICE 2,477,416

POPCORN MACHINE

Charles E. Page, Los Angeles, Calif.

Application June 2, 1945, Serial No. 597,354

4 Claims. (Cl. 99—238.1)

This invention relates to a popcorn machine, that is to say, a machine for producing popcorn, and it relates particularly to machines of the type in which the corn is popped in a heated holder or kettle.

One of the objects of the invention is to produce such a popcorn machine of simple construction which will operate efficiently to pop the corn with a minimum consumption of gaseous fuel, or other heating agent.

Another object of the invention is to provide a construction for mounting the kettle, and for supplying heat to a burner or heater for the kettle which will operate in such a way as to shut off the heating at the burner when the kettle is tilted to discharge the popped corn.

The invention relates also to an agitator for the popping corn, and one of my objects is to provide a popcorn machine having a power driven agitator, and in which the holder or kettle for the popcorn can be readily tipped when desired to discharge the popped corn from the machine; also to construct the driving mechanism for the agitator in such a way that when the popcorn is being dumped, the drive to the agitator is disconnected, thereby economizing the power required for driving the agitator.

Another object of the invention is to provide a motor-operated driving mechanism for the agitator of the machine having readily accessible and simple means for effecting the driving of the agitator by hand in case of failure of the power drive for the same; also to clean out the kettle and to clear a jam if the movements of the agitators become clogged by an overload of corn.

Another object of the invention is to provide a machine of this kind with gravity controlled valve means for automatically shutting off the flow of the fluid that controls the heat, for example, gas flowing to the burner when the kettle is moved or inverted to discharge a batch of popped corn, but operating so as to maintain the pilot flame during the time the kettle is in its dumping position.

When kernels of corn are popped on a popping deck or kettle bottom, unless they are agitated there is a tendency for sides of the kernels to become locally burned in spots, and if this burning occurs to such an extent as to vent the shell of the kernel, the kernel will not confine the popping pressure that would normally be developed by the heat within the kernel. In other words any hot pressure-developing vapors would escape through the small holes burnt in the shell of the kernels.

Hence, one of the objects of this invention is to provide a popcorn machine with means for preventing, as far as possible, localized burning of the corn kernels as referred to above, and to provide a construction whereby, as the popping progresses, the kernels on the bottom of the kettle, or popping deck, will be rolled and turned over constantly by the agitating means as they are being heated, and also so as to prevent their skins from being worn thin by rubbing over the popping deck.

Another object of the invention is to provide a burner for gaseous fuel having improved means for distributing the fuel to the ports or fuel outlets for the burner at which the fuel is ignited; also to provide a construction for the burner that will operate to effect a substantially uniform distribution of the quantity of fuel consumed, throughout the area of the burner in the zone of consumption of the fuel, thereby enabling the burner to heat the popping deck or kettle bottom uniformly throughout its area.

Another object of the invention is to provide a drive for the agitator of a popcorn machine that is adapted for driving the agitators of a gang of popcorn machines, each capable of independently popping and dumping batches of popcorn, and which will disconnect their drives to their agitators when they are tilted to discharge their load of popped corn.

Further objects of the invention will appear hereinafter.

The invention consists in the novel parts and combination of parts to be described hereinafter, all of which contribute to produce an efficient popcorn machine.

A preferred embodiment of the invention is described in the following specification, while the broad scope of the invention is pointed out in the appended claims.

In the drawing:

Figure 2 is a vertical section taken about in the plane of the line 2—2 of Figure 1.

Figure 2a is a fragmentary plan on line 2a—2a on Fig. 2 illustrating a detail of the construction.

Figure 3 is a plan view upon an enlarged scale looking down on the burner from about the location of the line 3—3 of Figure 2, but showing portions of the kettle casing or housing.

Figure 4 is a vertical section taken on line 4—4 on Figure 3 through the central portion of the burner, and is a fragmentary view particularly illustrating means employed in this central portion of the burner for facilitating the equal distribution of the fuel to all sections of the burner annulus or ring.

Figure 5 is a cross-section through the annulus of the burner taken about on the line 5—5 of Figure 3, but upon an enlarged scale as compared with the scale of Figure 3.

Figure 6 is a plan of the agitator of the type that would be employed with a round or circular kettle, such as illustrated. This view illustrates the preferred form of the agitator arms for effecting inward and outward travel of the kernels as they are moved forwardly on the popping deck or kettle bottom.

Figure 7 is a side elevation of a gravity controlled check-valve of a type that I may employ in the gas connection for supplying the gas to the burner, and which automatically cuts off the flow of gas to the burner when the popping kettle is tilted to its dumping position.

Figure 8 is a section through another type of gravity controlled valve that I may employ, also for automatically shutting off the gas to the burner, and this valve is of the ball type.

Figure 9 is a section taken about on the line 9—9 of Figure 6 and illustrating how the agitator arms operate to advance the kernels in the bottom layer on the kettle bottom, and also illustrating how these agitators will effect the rolling or turning over of these kernels that are in direct contact with the kettle bottom.

Figure 1:
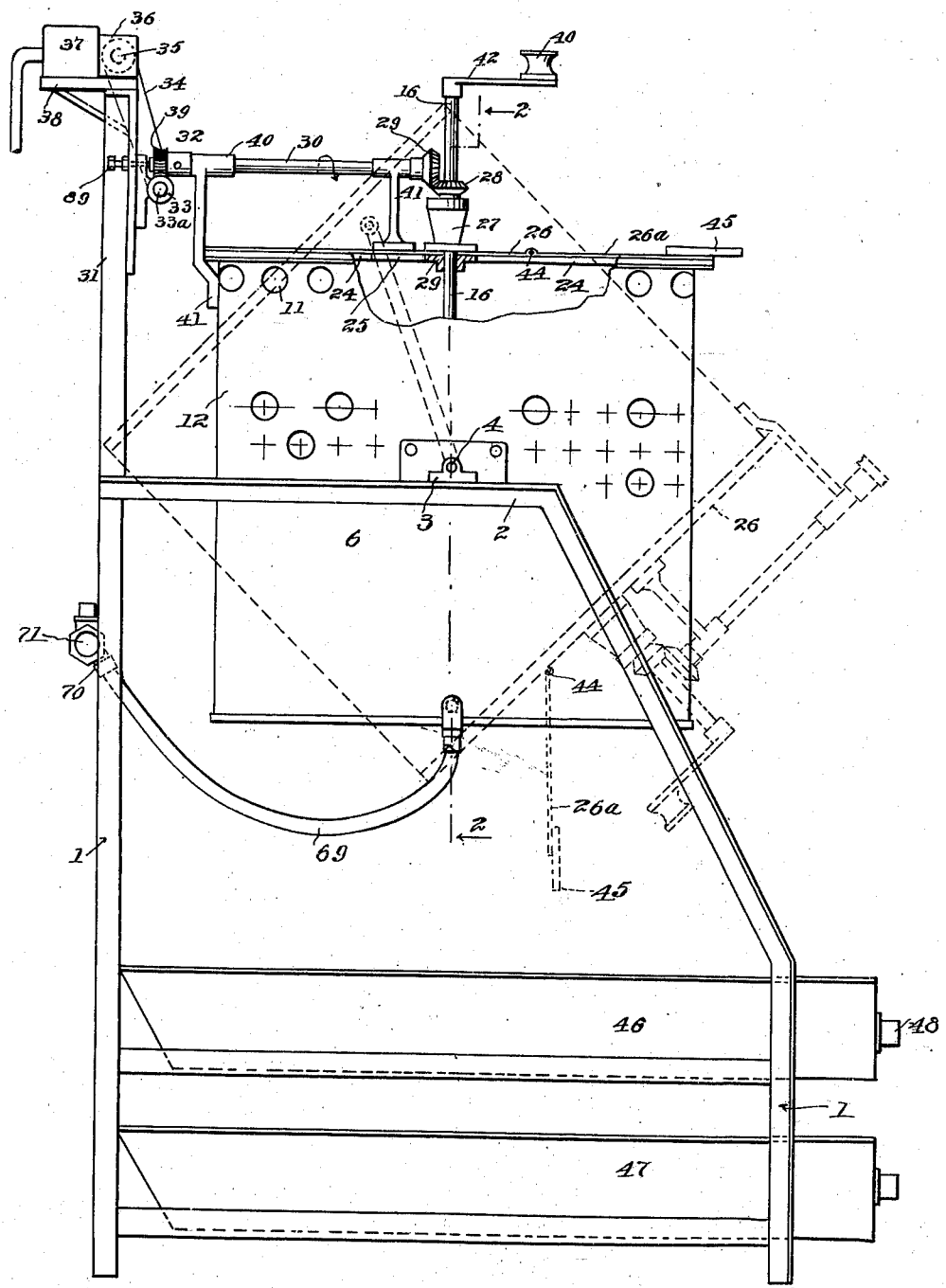
Figure 1 is a side elevation of a popcorn machine constructed in accordance with my invention, and in this view the popcorn holder or kettle is illustrated in dotted lines in its dumping position.

Referring more particularly to the parts and especially to Figures 1 and 2, 1 indicates a frame adapted to be constructed of bar metal, preferably angle iron, and this frame 1 includes two bent side bars 2, the upper portions of which are provided with bearings 3 for carrying trunnions 4 on which the kettle 5 can be mounted for rotation.

As shown in Figure 2 the kettle 5 is not directly mounted on its trunnions 4 but it is encased in an outer shell or housing 6 of substantially cylindrical form, that is of somewhat larger diameter than the kettle 5, the upper edge of the kettle being provided with an outwardly projecting flange 5a. On the under side of this flange seats the upper flange 7 of the cylindrical casing 6. This casing 6 operates as clothing to retain the heat from the burner 8 up the side of the kettle. In other words, there is an annular space 9 between the cylindrical wall of the kettle and the casing 6, up which the gases of combustion pass from the kettle bottom 10; and the casing 6 is provided with a plurality of vents 11 at an elevated point shown in Figure 1, and with similar vents 12 that are located at a somewhat lower level. These latter vents provide secondary air for combustion, facilitate the circulation of the hot air up around the kettle, and prevent overheating of the kettle.

In a machine of this type, having a substantially cylindrical kettle I provide a rotary type of agitator 13, which is provided with a central hub 14 secured by a set-screw 15 to the lower end of an agitator shaft 16. The agitator comprises a plurality of arms 17 preferably having substantially the shape illustrated in Figure 6. The arms are formed of small, stout, spring wire, the inner ends of which are bent around and welded to an angular neck 18 formed at the lower end of hub 14. As illustrated in Figure 6 by the arrow, the direction of rotation of the agitator 13 is clockwise, and the body portions 17a of the arms 17 are disposed in an inclined position with respect to a radial line from the axis of the shaft 16, and this inclination is toward the rear with respect to the direction of rotation as the body of the arm approaches the axis of rotation. At their inner portions the arms 17 are substantially radial, or nearly so, from the axis, and are connected by a merging curve 19 to the body portion 17a. At their outer ends the arms 17 incline slightly rearwardly with respect to the direction of rotation, where they are formed with upwardly extending curved tips 20 that extend up along the inner curved face 21 of the kettle, that is struck on a radius and which merges the upper face of the kettle bottom into its side wall.

During the rotation of the agitator the kernels of corn that are in contact with the driving side of the body 17a will be moved gradually and progressively inwardly toward the center of the agitator, on account of the direction of inclination of these bodies. This tends to produce a crowding of the kernels in the middle zone or central zone adjacent to the shaft 16, so that when the kernels arrive at this zone the overcrowding effect tends to produce an outward movement of the kernels in the spaces between the arms 17. Furthermore, as indicated in Figure 9, as the arms 17 sweep along the bottom of the kettle their driving sides engage the layer of kernels that is resting directly on the bottom, and as the arms sweep along in their driving movement they cause turning or rolling of the kernels 22 (see Figure 9). This is a highly advantageous effect because it prevents the bottom layers of the kernels from resting for too great a length of time in one position on the bottom, and this, of course, prevents any localized burning which might penetrate through the depth of the shell of the kernel. If that occurs the shell will not retain the hot gases that form within the kernel by reason of the heating, which, of course, would interfere with the proper popping of the kernels.

Referring again to Figure 1, the driving shaft 16 for the agitator passes up through a bearing 23 formed in a cross-bar or bridge-bar 24, the ends of which are turned down to form feet 24a (see Figures 2 and 2a), which are attached by screws 24b to the inner face of the kettle adjacent to its upper edge. This cross-bar or bridge 24 has an integral extension 25 that forms a supporting seat for one of the bearings for the driving mechanism, as will be described presently. The upper side of the cross-bar or bridge 24 supports a plate-form cover 26 for the kettle, and on the upper side of the cover a gear mounting or pedestal 27 is provided through the upper end of which the shaft 16 extends to carry a bevel gear 28 meshing with a similar bevel gear 29 carried on a driving shaft 30. This shaft extends over toward the back, or upper frame 31 of the machine.

The reduction gear 36 and the motor 37 are mounted on a suitable bracket 38, supported on the upper end of the back frame 31. The direction of rotation of the shaft 30 is indictaed by the arrow in Figure 1, which will give the agitator 17 a clockwise rotation as indicated by the arrow in Figure 6.

On the shaft 30 a worm-gear 39 is secured, meshing with the worm 33, and these two parts are designed so that the shaft 30 will be given the direction of rotation indicated. The worm 33 has a righthand driving helix on it, and hence, the thrust of the helix of the worm against the teeth of the worm-gear 39 is exerted in an inclined direction as viewed in plan, so the thrust is toward the back frame 31. By reason of this direction of thrust of the worm, the worm exerts a force on the shaft 30 tending to pull it toward the frame 31, and this operates to hold the worm-gear in mesh with the worm, when the shaft 30 is being driven.

The outer end of the shaft 30 is supported for rotation in a suitable bearing bracket 40 that extends downwardly and is provided with a foot 41 that may be supported in any desired manner, for example, by attachment to the shell 6 of the kettle, as shown.

The inner end of the shaft 30 is supported on a suitable bearing bracket 41, the lower end of which seats on the cover plate 26 directly over the extension 25 already described, that projects off from the bridge-bar 24.

In order to enable the agitator 13 to be driven by hand when desired, while the kettle is in its dumping position or in any position, in fact, in which the worm-gear 39 would be disconnected from the driving worm 33, I provide the upper end of the shaft 16 with a crank 42, having a suitable knob or handle 43 for rotating it.

The cover 26 is provided with a hinged portion 26a which is connected to the body of the cover by a suitable piano hinge 44 (see Figure 1). This lid 26a at its outer edge is provided with a suitable handle 45 by means of which the lid can be lifted to make a charging opening through which the popcorn can be poured into the kettle 5. This lid is preferably gravity controlled, and opens automatically when the kettle is rotated or tilted into its dumping position, such as that in which it is indicated in dotted lines in Figure 1. When this occurs the hinge connection 44 will descend to a level near the normal level of the lower end of the shell 6, and the lid 26a will then hang down, as indicated in dotted lines, in a substantially vertical position. When this occurs the cover 26 will be disposed in an inclined position and the popped corn will run or slide down and pass out of the kettle. This will deposit the popcorn into an upper grading pan 46 that is supported like a drawer in the lower part of the frame 1. This pan has a perforated bottom, not illustrated, that will permit the unpopped corn to fall into a lower pan 47 which, of course, takes the tailings from the grading pan 46. These pans can be pulled out from time to time and dumped, for which purpose they are provided with handles 48 at their outer ends, which may project at the forward side of the machine as indicated in Figure 1.

The machine is provided with means for supplying gaseous fuel to the burner 8 in sufficient quantity to pop the corn when the kettle 5 is in its upright or normal position; and the gas connections for this purpose include automatic means for saving gas consumption by shutting off the burner when the kettle is in its dumping position. The burner 8 is illustrated in Figure 2 as supported on a plurality of radially disposed long bolts 49, the threaded ends of which are received in threaded sockets on the periphery of the burner. Their outer ends are mounted in bolt holes in the casing 6 and provided with screw-driver heads 50 for securing them in place.

The burner is supplied with fuel through an inlet connection 51 (see Figure 3), that delivers the fuel into a goose-neck-shaped venturi 52, the outer end of which is formed into a bell mouth 53 into which the reduced end or nozzle 54 of the inlet 51 extends, so as to attain a Venturi effect. The construction at this inlet includes an adjustable air mixer plate 55 of any suitable construction such as employed in gas connections of this kind, and this plate has a thread connection with the reduced neck or nozzle 54 that carries the gas into the mouth 53 so that this plate 55 can be adjusted toward or from the mouth 53 to control the width of the air gap 56 through which primary air can flow.

Referring now particularly to Figure 3, I provide a gas connection or assembly 57 for conducting the gas to the inlet 51, and this connection includes a gravity-controlled check-valve 58 of ball or flapper type, and a hand controlled valve, such as a globe valve 59 controlled by means of a hand wheel 60 that extends down at the under side. Any suitable type of check-valve 58 may be employed, but in Figure 7 I illustrate a valve for this purpose within which a valve closure 61 is pivotally supported at the bonnet extension 62 of the valve-body. This valve closure 61 is carried on a shaft 63 that is rotatably mounted in the extension 62, and on the projecting end of this shaft a counterweight 64 is suspended. In examining Figure 7 it should be noted that the valve 58 in Figure 7, as shown at its inner side, is so constructed that the gas passing the valve would pass from right to left. When the kettle and its casing 6 swing up on the axes of the trunnions 4 into the inverted, or dumping, position illustrated in dotted lines in Figure 1, the end of the gas connection 57 that is located nearest to the rear of the machine will become elevated, and the counterweight 64 will maintain itself in a nearly vertical position. This will relatively swing the closure 61 onto its seat within the valve 58 and substantially shut off flow of the gas. As the gas pressure will be exerted on the back of closure 61 this will assist in holding this valve closed.

The outer end of the gas connection 57 is attached to a swivel gas fitting 65 that is formed with a neck 66 at its outer end that extends through an opening in the cylindrical shell 6, beyond which it is attached to a hose fitting 68, or any other suitable fitting that is adaptable to connect up to a flexible connection. This is preferably in the form of a hose 69. This hose is illustrated also in Figure 1, and in that view the outer end of the hose is illustrated as attached to an end fitting 70 (see Fig. 1), which also has a swing-joint connection, not illustrated, that connects to a fixed fitting 71, connected to a gas supply.

I construct the burner 8 in such a way as to attain a very efficient distribution of flame under the kettle 5. These features are illustrated in Figures 3, 4, and 5, and include a central portion or hub for the burner which has a chamber 71 within it to which the gas is admitted from below after passing up through the goose neck 52; this enables this current of admitted gas to impinge upon a crown or disperser wall, flowing at right angles to the "plane" of the crown. The crown has its greatest depth at the central point 72, from which point the face 73 of this crown extends upwardly as it approaches the periphery of the hub 70. In this way the incoming gas is diverted, without regurgitation effects, so that the gas will flow outwardly in the substantially radial ducts 74 that extend off from the central chamber 71, and which lead out to the rim or annulus 75 of the burner. This annulus in the present instance, is of circular form, and I prefer to provide it with two sets of orifices or perforations 76 which are preferably disposed substantially as indicated in Figure 5. These burner outlets or perforations 76 are drilled holes having their axes disposed at an angle of approximately 30° from the vertical, and the set of perforations that are disposed toward the inside, direct the gas inwardly, while the perforations on the outer side direct it outwardly. In this way a sufficient quantity of gas is supplied for an efficient operation of the burner. I prefer, also, to form these perforations 76 on annular, conical faces or zones 77 which are disposed at a slight distance from the outer surface of the ring or annulus 75, which forms the outer portion or periphery of the burner. This operates to provide a depression or valley 78, developed between the two sets of orifices to which the air above the burner has ready access for feeding the flame with oxygen.

The cross-section of each of the radial ducts 74 is substantially the same as that illustrated in Figure 5 for the ring 75; in other words, the upper surface of the cover wall of each duct 74 is provided with two inclined boss-bands 79 that extend parallel with each other along the upper side of each radial duct, and each of these boss-bands is provided with perforations 80 similar to the perforations 76; and these perforations are also formed on axes inclined outwardly in an upward direction so as to direct the flames issuing from them divergently, and in a lateral direction from the axes of the ducts 74.

The gas fitting 65 is provided with a pilot-valve 81 having a hand-wheel 82 for setting the same to any desired degree of opening, and this valve has a pilot-tube or burner 83 that extends off from it and presents its tip 84 in a position to ignite the gas issuing from the burner 8 whenever it is turned on.

As this pilot-valve 81 is located before the check-valve 58 with respect to the direction of the flow of the gas, it is evident that the gas will always be furnished to the pilot tube 83 regardless of any position the kettle may assume.

In connection with this burner 8 it should be noted that when the gas flowing outwardly in the radial ducts 74 arrives at the ring or annulus 75, the gas will divide itself into two currents flowing in opposite directions in the annulus as indicated by the arrows at 85 in Figure 3. This insures an ample supply of gas to the orifices 76 that are located on the portions of the annulus 75 that are located about midway between any two adjacent ducts 74. This burner has been found in practice to be extremely efficient as a burner. It has relatively large internal volume relative to the rate of consumption so as to develop a plenum-chamber effect that makes for uniformity of consumption of gas at all its outlets.

In Figure 8 I illustrate another type of check-valve that I may substitute for the valve 58 illustrated in Figure 7. This valve 85 is a ball-type check-valve and has a ball chamber 86 within it, with a valve seat 87 at one end for this ball. This valve 85 will be connected up into the pipe connection 57 in such a way that the flow of the gas would be from right to left. When the kettle is in its normal, upright position the ball 88, moving freely in the ball chamber 86, would occupy a position such as illustrated in Figure 8, but in the dumping position of the kettle the ball would rest on the seat 87, and shut off the flow of gas to the burner. The inner surface of the wall of the ball chamber 86 is, of course, curved somewhat as shown so as to assist in guiding the ball 88 onto its seat 87. In this view the position of the ball on the seat is indicated in dotted outline. Of course the pressure of gas tends to seat the ball, and the stronger the pressure, the better the seating effect.

An adjustable stop 89 in the form of an adjustable bolt (see Figure 1) is provided mounted in the frame. This stop engages the end of shaft 30 or some part near, or associated with, the shaft to prevent the worm wheel from meshing to close into the worm.

The mode of operation of the entire machine will now be briefly recapitulated. While the kettle 5 and its casing 6 are in the upright position illustrated in full lines in Figure 1 the lid 26a would be lifted, by the attendant, on its hinge-connection 44, so as to permit the charge of unpopped corn to be placed within the kettle 5. The switch (not illustrated) for the circuit to the electric motor 37 would then be closed, and the gas valve 59 opened, so as to start up the popping operation. The burner gas immediately ignites, and the agitator spider 13 will immediately commence rotating so as to agitate the kernels of corn on the bottom of the kettle. When the batch of popcorn is substantially all popped the attendant will seize the crank 6a and pull it toward him, assuming that he is standing in front of the machine. This will tilt the kettle and its casing 6 downwardly toward the front, and will eventually lower the cover of the kettle to the nearly inverted position such as that in which it is indicated in dotted lines in Figure 1. The lid 26a will then swing open by gravity and the popcorn within the kettle will fall out through the opening normally closed by the lid, and will descend into the grading pan 46. By shaking this pan to and fro the unpopped corn will pass through into the lower pan 47. Each of these pans is supported like a drawer on the frame 1 and when desired they can be pulled out and dumped.

As soon as the tilting movement of the kettle and its casing 6 commences, the worm-gear 39 will swing upwardly on the trunnions 4 as an axis, and will disengage itself from the worm 33. This of course will stop the drive to the agitator shaft 16. However, if it becomes necessary to rotate the agitator this can be accomplished through the agency of the handle 43 on the crank 42.

As the kettle and its casing 6 are arriving at the inverted, or dumping, position illustrated in the dotted outlines in Figure 1, the gravity-controlled check-valve 58 will close and shut off flow of gas to the burner 8; but will not affect the pilot burner 83 which supplies gas continuously to maintain the pilot flame.

The hose 69 maintains itself as a flexible connection for supplying the fuel to the pilot burner in any position in which the kettle may be placed, and due to the use of the swivel fitting 65, when the kettle is restored to its upright position the main burner 8 will light automatically from the pilot flame.

The operation of the agitator is important. Located as it is, substantially against the bottom of the kettle 5, its arms 17 will maintain themselves in contact with the kernels of corn that are resting directly on the kettle bottom. As these arms 17 sweep around on the bottom of the kettle they will cause the kernels at the bottom of the batch of corn to turn over and over so that they will not be left for more than a fraction of a second with the same point on their shells in contact with the hot bottom of the kettle; in other words, they will be continuously rolled over and over; if not contacted directly by the arm, they will be pushed or rolled by kernels that are in contact with the arms. This prevents burning or weaking the skin of the kernels in such a way as to prevent them from developing the internal pressure that pops them.

By reason of the inclined direction of the body 17a of these arms 17 the kernels toward the periphery will travel inwardly toward the central zone of the bottom of the kettle, and this will increase the density of the kernels near the middle zone; that is to say, will produce a crowding effect so that after the kernels have been moved inwardly along the arms they will be caught in a current of kernels moving outwardly between the arms, so that a kind of "rip tide" effect is obtained. This produces a thorough stirring and agitation of all the kernels and insures very uniform and thorough popping of the entire batch.

If desired, the shaft 33a for the worm 33 may be extended to form a long shaft that may be driven by a single larger motor. In this way one motor may drive the agitators of a gang of these popcorn machines. In other words, the individual motor drives would be dispensed with, and, of course, any kettle in the gang could be dumped and operated without effecting the operation of any of the other machines in the gang.

The kettle 5 and the bridge-bar 24 are preferably made of #43 aluminum alloy that is impervious to the salt and oil used in corn popping operations. The cover 26 and the casing shell 6, however, are preferably composed of stainless steel.

If the kettle is overloaded so greatly as to stall the motor, then the torsion in the shaft 30 will cause the worm to force the worm wheel 39 out of engagement with it. This will call the attention of the attendant who will then grab the crank 42 and forcibly rotate the agitator to clear it.

Many other embodiments of this invention may be resorted to without departing from the spirit of the invention.

I claim as my invention:

1. In a popcorn machine or the like, the combination of a frame, a popcorn kettle, trunnions supporting the kettle on said frame, and enabling the same to be swung into a substantially inverted, dumping, position for effecting the discharge of the popped corn, a burner associated with the kettle for heating the same, a flexible connection for operating said burner, gravity-controlled means for substantially shutting off operation of the burner when the kettle is in its dumping position, an agitator for the popcorn mounted adjacent the popping deck of the kettle, driving mechanism for driving the agitator including a relatively fixed driving-gear supported on the frame, and a relatively movable driven-gear mounted on the said kettle so as to move in unison with the kettle when it is moved away from its upright position, and so as to disconnect the driving connection when the holder is moved to its dumping position.

2. In a popcorn machine or the like, the combination of a frame, a popcorn kettle with trunnions supporting the same on said frame to enable the kettle to be moved from its normal upright position to a dumping position, an agitator mounted within the kettle adjacent to its popping deck, an agitator shaft extending upwardly from the agitator for driving the same, means for driving the agitator shaft including a driving worm mounted on the frame, and a worm-gear driven thereby, supported on the kettle, meshing with the worm and operating to move away from the worm and break the driving connection to the agitator when the holder is moved to its dumping position.

3. A popcorn machine according to claim 2 in which the worm-gear is mounted so as to rest on the upper side of the worm when the kettle is in its upright position.

4. A popcorn machine according to claim 2 in which the thrust of the thread of the worm against the worm-gear is in a direction tending to move the kettle and the worm-gear toward the worm, to maintain the worm-gear in contact with the worm.

CHARLES E. PAGE.

REFERENCES CITED

The following references are of record in the file of this patent:

UNITED STATES PATENTS

| Number | Name | Date |
| --- | --- | --- |
| 434,822 | Doty | Aug. 19, 1890 |
| 1,160,413 | Kellogg | Nov. 16, 1915 |
| 1,260,442 | Pickup | Mar. 26, 1918 |
| 1,272,725 | Talbert et al. | July 16, 1918 |
| 1,695,587 | Harris | Dec. 18, 1928 |
| 1,759,475 | Walker | May 20, 1930 |
| 1,880,822 | Cook et al. | Oct. 4, 1932 |
| 2,115,956 | Jorgenson | May 3, 1938 |
| 2,254,271 | Cretors | Sept. 2, 1941 |